Patented June 2, 1925.

UNITED STATES PATENT OFFICE.

ROBERT E. WILSON, OF CAMBRIDGE, MASSACHUSETTS, ASSIGNOR TO THE BALTIMORE GAS ENGINEERING CORPORATION, OF BALTIMORE, MARYLAND, A CORPORATION OF MARYLAND.

GELLIKE ABSORBENT AND PROCESS OF MAKING SAME.

No Drawing.   Application filed January 28, 1920. Serial No. 354,690.

*To all whom it may concern:*

Be it known that I, ROBERT E. WILSON, a citizen of the United States, residing at Cambridge, in the county of Middlesex and State of Massachusetts, have invented certain new and useful Improvements in Gellike Absorbents and Processes of Making Same, of which the following is a specification.

This invention relates to dense, hard, granular, partially hydrated gel-like absorbents consisting of metallic hydroxides such as the hydroxides of aluminum, chromium, calcium, copper, iron, nickel, cobalt, etc. and to the process of making the same.

The product is intermediate between, but quite distinct from two widely different products which have previously been known. For example by the dialysis of a colloidal solution of basic ferric chloride for a week or two, using a semi-permeable membrane, it is possible to wash out all the soluble salts and leave an extremely fine colloidal solution of ferric hydroxide, which if carefully evaporated down, will produce deep blood-red, semi-transparent, dense particles of true ferric hydroxide gel. This process, however, is extremely time consuming and difficult, and it is probable that not more than a few grains have ever been produced at one time—not enough to determine its value for any special purpose. It could certainly not be carried on with profit as a commercial process.

On the other hand, other investigators have made precipitated ferric hydroxides, which they have dried to form into roughly granular material, and which have been shown to have some absorptive properties. All such granules (of ferric hydroxide for example) have, however, been soft, light yellow or light red brown in color, with a low apparent density, and no tendency whatever to transmit light or show a vitreous fracture. These particles resembled soft baked clays more than any other product. Where any specific directions are given for their preparation, complete dehydration is specified.

The product of this invention was made after a very careful study of all the conditions and is also formed by the precipitation of some iron salt with an alkali, but by the most careful control during preparation of the solutions, precipitation, washing and especially drying, a very different product is obtained from any previously made by a precipitation method. It is very hard, dense, has a vitreous fracture and in some respects approaches the true gels in appearance, although it is not so transparent and is very dark red brown rather than a blood red. The best samples hold from 8 to 12% $H_2O$ after drying several hours in a vacuum at 150° C. while ordinary precipitated material is almost completely dehydrated by this treatment.

The ferric hydroxide produced by this process has, after grinding and screening to size, an apparent density of about three times as great as, an absorptive power against gases about ten times as great as, and a strength very much greater than the ordinary ferric hydroxide granule gels previously made by precipitation methods. Its activity is greater than that of the best charcoal, especially against such gases as phosgene, superpalite. chlorpicrin, arsine, etc. It is essential that it be partially but not completely hydrated, (about 9–12% of $H_2O$ being the optimum).

This absorbent may be used mixed with absorbent charcoal in a gas mask canister as a substitute for soda lime, to which it is superior in efficiency, and the mixture tends to keep the charcoal much drier than when soda lime is used, which is an advantage. The material also has advantages wherever a dense firm structure of iron oxid, metallic iron, or any iron compound is desired for catalytic and other purposes. This iron gel may be treated or reduced in various ways without entirely destroying its structure, which consists essentially in a porous skeleton of ferric hydroxide permeated by an enormous number of ultramicroscopic pores. Iron produced by reducing the granules in hydrogen is very markedly pyrophoric. The gel in its original or modified form may be used for storage battery plates, as a catalytic agent in many processes, such as the combination of nitrogen and hydrogen to form ammonia, etc. where very finely divided iron or its compounds is desired.

By a long series of experiments it was found that certain steps in the production of these absorbents constitute important variables in the preparation of an extremely active gel. The metallic hydroxid is precipitated from a solution of its salts, for instance, ferric chlorid by means of an alkali, such as caustic soda, filtering and drying the product. The age of the solution before precipitation, the temperature of precipitation, the pressure in the filter press and the exact method of drying are especially important factors. From experiments it was found that when a precipitate was formed which remained a dark red brown after standing for some time, as several days, the resulting, dried gel which was then obtained was much more active than when the precipitate turned to a lighter color on standing.

It was found that the length of time the ferric chlorid solution had stood in a diluted condition before mixing with the caustic soda was very important. If the precipitation was made within a short time, say one-half hour after the solution was diluted, a yellow preciptate (i. e. one slowly turning yellow) was formed, whereas if the diluted solution was allowed to stand for from one to four days the red-brown precipitate which denotes an efficient absorbent was produced. It was also found that a concentration of the reacting solutions of from six to ten percent and a reaction temperature of 30 to 50° C., gives the best dark red-brown precipitate. This temperature can ordinarily be obtained by the heat of reaction of the solutions. The solution after precipitation should contain a slight excess of alkali for reasons of economy, although a large excess even as high as sixty percent does not produce harmful results. Washing by decantation should be very thorough. A fairly high pressure should be used in forming the filter cake, to squeeze out all the excess water. The temperature of drying is important, and should not exceed 200–225° C., should be slow at the start, and is preferably performed in two stages, as hereinafter described.

A method of preparation of this absorbent which has been found to give good results is as follows: A six percent solution of ferric chlorid in water is poured slowly and with constant stirring into a six percent solution of caustic soda, the amount of the caustic soda being slightly in excess of the theoretical amount necessary for complete precipitation, the ferric chlorid solution being made up at least one day before the precipitation and the temperature of the two solutions being 30 to 40° C. The exact method of mixing the two solutions is unimportant, except that they should be stirred and the ferric chlorid poured into the alkali; not vice versa. The precipitate is washed by decantation until the wash water shows only a trace of chlorids, the sludge is filtered in a filter press, blown at 85 to 100 lbs. per square inch of air pressure, kneaded until uniform, and packed in a cake about 1½ to 2 in. deep in screen bottomed trays which are put immediately into an oven at a relatively low temperature of 110° C. with a free circulation of air. When the cake appears perfectly dry, it is removed, ground and screened to the required mesh and dried for six hours at 150° C with about 27 or 28 inches of vacuum. If a good dark red precipitate is used the amount of water left in the gel by this treatment will be very close to the optimum 8–13% (based on ignition at a dull red heat). It appears to be of some advantage to boil the sludge for one-half hour before filtering, filter and then subject the precipitate to high pressure. The granules thus formed have an apparent density of 1.15 to 1.30, preferably 1.25–1.30, (as determined by weighing 100 c. c. of 8–14 mesh granules which are introduced into a graduate by dropping through a funnel).

The fines produced by grinding may be mixed with an equal weight of water and ground in a pebble mill for several hours, after which they are filtered and dried in the usual manner and incorporated with a batch of fresh material.

Although in the specific example given above certain definite proportions and specific steps are enumerated, it is not intended that this invention be limited to such details but it is desired to claim broadly the new gel-like material and the process of making the same, except as limited by the following claims. For instance, salts of other metals as of aluminum, chromium, calcium, nickel, cobalt or copper may be treated in a similar way with somewhat similar results, but the salts of iron have been found to give the best results as a general absorbent. Other alkalies as ammonium hydroxid may replace the caustic soda in precipitating the metallic hydroxid; and ferrous salts as the sulphate may be precipitated by means of an alkali and oxidized to ferric hydroxid by an oxidizing agent such as sodium hypochlorite. The material may be mixed up with charcoal fines, although this greatly decreases its strength.

This absorbent compares favorably with the best activated charcoals, is probably cheaper to manufacture and may also be used as a dehydrator for gases, being more efficient than charcoal. It also has catalytic properties and may be reduced to metal or nitrid and still retain its structure.

I claim as my invention:

1. A gel-like ferric hydroxide containing 8 to 13% combined water, as determined by igniting to a low red heat.

2. A hard, porous, partially hydrated ferric hydroxide, 8 to 14 mesh granules of which have an apparent density of 1.15 to 1.30.

3. An absorbent comprising a gel-like, metallic hydroxide mixed with carbonaceous material.

4. An absorbent comprising gel-like, ferric hydroxide mixed with absorbent charcoal.

5. In a process of producing gel-like absorbents, preparing a dilute solution of a metallic salt which tends to hydrolize in a dilute solution, allowing same to age and then precipitating with an alkaline reagent.

6. In a process of producing gel-like absorbents, preparing dilute solution of ferric salt, allowing same to age and precipitating with an alkali.

7. In a process of producing gel-like absorbents, preparing a dilute solution of ferric chloride, allowing same to age one to four days and then precipitating with dilute caustic soda.

8. In a process of producing gel-like absorbents, washing by decantation an absorbent material after precipitation and then drying same first at about 110° C. and then about 150° C.

9. In a process of producing gel-like absorbents, washing by decantation an absorbent material after precipitation and then drying same first at about 110° C. in air and then about 150° C. in a vacuum.

10. In a process of producing gel-like absorbents, washing by decantation an absorbent material after precipitation, kneading and then drying same at a relatively low temperature and finally at a relatively higher temperature.

11. In a process of producing gel-like absorbents, preparing dilute solution of ferric salt, allowing same to age one to four days and precipitating with an alkali solution, the strengths of said solutions being from 6 to 10%.

ROBERT E. WILSON.